(12) United States Patent
Myers (10) Patent No.: US 7,842,903 B2
(45) Date of Patent: *Nov. 30, 2010

(54) SHORT ARC WELDING SYSTEM (75) Inventor: Russell K. Myers, Hudson, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 11/263,064

(22) Filed: Oct. 31, 2005

(65) Prior Publication Data

US 2007/0095807 A1 May 3, 2007

(51) Int. Cl.
B23K 9/09 (2006.01)

(52) U.S. Cl. ............................ 219/130.51; 219/130.21; 219/137 PS (58) Field of Classification Search ................................ 219/130.31–130.33, 130.5, 130.51
See application file for complete search history.

(56) References Cited

U.S. PATENT DOCUMENTS

| 2,802,762 | A | 8/1957 | Stetson et al. |
| 3,177,340 | A | 4/1965 | Danhier |
| 3,415,976 | A | 12/1968 | Smith |
| 3,424,892 | A | 1/1969 | Wilcox |
| 3,458,685 | A | 7/1969 | Tezuka |
| 3,461,270 | A | 8/1969 | Patton |
| 3,466,417 | A | 9/1969 | Chapman |
| 3,539,765 | A | 11/1970 | Duttera et al. |
| 3,566,073 | A | 2/1971 | Black |
| 3,585,343 | A | 6/1971 | Crichton |
| 3,596,053 | A | 7/1971 | Kameda |
| 3,627,574 | A | 12/1971 | Delong |
| 3,670,135 | A | 6/1972 | Zvanut |
| 3,702,390 | A | 11/1972 | Blake et al. |
| 3,742,185 | A | 6/1973 | Parks |
| 3,767,891 | A | 10/1973 | Haverstraw |

(Continued)

FOREIGN PATENT DOCUMENTS

EP 0125925 A2 11/1984

(Continued)

OTHER PUBLICATIONS

U.S. Appl. No. 11/103,040, filed Apr. 11, 2005, Stava.

(Continued)

*Primary Examiner*—Tu B. Hoang
*Assistant Examiner*—Brian Jennison
(74) *Attorney, Agent, or Firm*—Hahn Loeser & Parks LLP (57) ABSTRACT A welding system for performing a short arc welding process between a advancing wire electrode and a workpiece. The system comprises a power source with a controller for creating a current pulse introducing energy into the electrode to melt the end of the electrode and a low current quiescent metal transfer section following the end of the melting pulse during which the melted electrode short circuits against the workpiece; a timer to measure the actual time between the end of the pulse and the short circuit; a device for setting a desired time from the pulse to the short circuit; a circuit to create a corrective signal based upon the difference between the actual time and the desired time; and, a circuit responsive to the corrective signal to control a given parameter of the current pulse.

25 Claims, 6 Drawing Sheets

U.S. PATENT DOCUMENTS

| | | | |
|---|---|---|---|
| 3,769,491 A | 10/1973 | De Long et al. |
| 3,778,588 A | 12/1973 | Bishel |
| 3,778,589 A | 12/1973 | Nakabayashi |
| 3,786,658 A | 1/1974 | Swaim |
| 3,787,658 A | 1/1974 | Kammer et al. |
| 3,866,015 A | 2/1975 | Matsumoto |
| 3,883,713 A | 5/1975 | Gurevich |
| 3,911,244 A | 10/1975 | Nakamura |
| 4,010,309 A | 3/1977 | Peterson |
| 4,020,320 A | 4/1977 | Pijls |
| 4,072,845 A | 2/1978 | Buckingham et al. |
| 4,122,238 A | 10/1978 | Frantzerb |
| 4,149,063 A | 4/1979 | Bishel |
| 4,154,999 A | 5/1979 | Pinfold et al. |
| 4,186,293 A | 1/1980 | Gonzalez et al. |
| 4,207,454 A | 6/1980 | Safonnikov et al. |
| 4,246,463 A | 1/1981 | Shutt et al. |
| 4,314,136 A | 2/1982 | Kotecki |
| 4,319,124 A | 3/1982 | Johansson |
| 4,366,364 A | 12/1982 | Arai et al. |
| 4,376,881 A | 3/1983 | Safonnikov et al. |
| 4,449,031 A | 5/1984 | Kotecki |
| 4,454,406 A | 6/1984 | Safonnikov et al. |
| 4,465,036 A | 8/1984 | Forbes et al. |
| 4,465,921 A | 8/1984 | Sakai |
| 4,510,374 A | 4/1985 | Kobayashi et al. |
| 4,512,822 A | 4/1985 | Barringer et al. |
| 4,551,610 A | 11/1985 | Amata |
| 4,557,768 A | 12/1985 | Barringer et al. |
| 4,571,480 A | 2/1986 | Sakai |
| 4,689,461 A | 8/1987 | Gamberg |
| 4,717,536 A | 1/1988 | Chai et al. |
| 4,717,807 A | 1/1988 | Parks et al. |
| 4,723,061 A | 2/1988 | Munz et al. |
| 4,794,232 A | 12/1988 | Kimbrough et al. |
| 4,800,131 A | 1/1989 | Marshall |
| 4,803,340 A | 2/1989 | Sato |
| 4,833,296 A | 5/1989 | Crockett et al. |
| 4,866,247 A | 9/1989 | Parks |
| 4,889,969 A | 12/1989 | Kawai |
| 4,948,936 A | 8/1990 | Landry |
| 4,954,691 A | 9/1990 | Parks et al. |
| 4,999,479 A | 3/1991 | Paton |
| 5,003,155 A | 3/1991 | Chai et al. |
| 5,015,823 A | 5/1991 | Crockett et al. |
| 5,055,655 A | 10/1991 | Chai et al. |
| 5,091,628 A | 2/1992 | Chai et al. |
| 5,120,931 A | 6/1992 | Kotecki et al. |
| 5,124,529 A | 6/1992 | Nishikawa |
| 5,124,530 A | 6/1992 | O'Donnell |
| 5,132,514 A | 7/1992 | Chai et al. |
| 5,220,151 A | 6/1993 | Terayami et al. |
| 5,220,551 A | 6/1993 | Tateishi et al. |
| 5,225,660 A | 7/1993 | Mita et al. |
| 5,225,661 A | 7/1993 | Chai et al. |
| 5,233,160 A | 8/1993 | Gordish et al. |
| 5,278,390 A | 1/1994 | Blankenship |
| 5,281,791 A * | 1/1994 | Tabata et al. ............ 219/130.51 |
| 5,304,346 A | 4/1994 | O'Donnell |
| 5,308,698 A | 5/1994 | Bishel |
| 5,349,159 A | 9/1994 | Mita et al. |
| 5,365,036 A | 11/1994 | Crockett et al. |
| 5,369,244 A | 11/1994 | Kulikowski et al. |
| 5,676,857 A | 10/1997 | Parker |
| 5,742,029 A | 4/1998 | Stava et al. |
| 5,861,605 A | 1/1999 | Ogawa |
| 5,914,061 A | 6/1999 | Ogawa |
| 5,961,863 A | 10/1999 | Stava |
| 5,981,906 A | 11/1999 | Parker |
| 6,051,810 A | 4/2000 | Stava et al. |
| 6,093,906 A | 7/2000 | Nicholson et al. |
| 6,111,216 A | 8/2000 | Stava et al. |
| 6,114,656 A | 9/2000 | Fairchild |
| 6,124,569 A | 9/2000 | Bonnet |
| 6,160,241 A | 12/2000 | Stava et al. |
| 6,172,333 B1 | 1/2001 | Stava |
| 6,204,478 B1 | 3/2001 | Nicholson et al. |
| 6,207,929 B1 | 3/2001 | Stava |
| 6,215,100 B1 | 4/2001 | Stava et al. |
| 6,291,798 B1 | 9/2001 | Stava |
| 6,300,596 B1 | 10/2001 | Bonnet |
| 6,337,144 B1 | 1/2002 | Shimizu |
| 6,340,396 B1 | 1/2002 | Ogawa |
| 6,441,334 B1 | 8/2002 | Aida |
| 6,472,634 B1 | 10/2002 | Houston |
| 6,501,049 B2 | 12/2002 | Stava |
| 6,515,259 B1 | 2/2003 | Hsu et al. |
| 6,521,867 B2 | 2/2003 | Bonnet |
| 6,573,476 B2 | 6/2003 | Kim |
| 6,617,549 B2 | 9/2003 | Ihde |
| 6,649,872 B2 | 11/2003 | Kato |
| 6,713,723 B2 | 3/2004 | Lee |
| 6,717,107 B1 | 4/2004 | Hsu |
| 6,723,954 B2 | 4/2004 | Nikodym et al. |
| 6,723,957 B2 | 4/2004 | Holverson et al. |
| 6,784,401 B2 | 8/2004 | North et al. |
| 6,841,246 B2 | 1/2005 | Shimizu |
| 6,872,914 B2 * | 3/2005 | Hsu ...................... 219/130.51 |
| 7,053,334 B2 | 5/2006 | Stava |
| 7,064,290 B2 | 6/2006 | Blankenship et al. |
| 7,145,101 B2 | 12/2006 | Tong |
| 7,166,817 B2 | 1/2007 | Stava |
| 7,271,365 B2 | 9/2007 | Stava et al. |
| 2001/0023863 A1 | 9/2001 | Bonnet |
| 2002/0030043 A1 * | 3/2002 | Tong ..................... 219/137 PS |
| 2002/0037420 A1 | 3/2002 | Shimizu |
| 2002/0043307 A1 | 4/2002 | Ishida |
| 2002/0060212 A1 | 5/2002 | Kim |
| 2003/0094444 A1 | 5/2003 | Kato |
| 2003/0116234 A1 | 6/2003 | Santella |
| 2003/0116548 A1 | 6/2003 | Blankenship |
| 2003/0116550 A1 | 6/2003 | Lee |
| 2004/0020912 A1 | 2/2004 | Hara |
| 2004/0187961 A1 | 9/2004 | Crockett |
| 2004/0188407 A1 | 9/2004 | Nikodym et al. |
| 2004/0256370 A1 | 12/2004 | Keegan |
| 2005/0051524 A1 | 3/2005 | Blankenship et al. |
| 2005/0127054 A1 | 6/2005 | Houston et al. |
| 2006/0070983 A1 | 4/2006 | Narayanan et al. |
| 2006/0226131 A1 | 10/2006 | Stava et al. |
| 2007/0095807 A1 | 5/2007 | Myers et al. |

FOREIGN PATENT DOCUMENTS

| | | |
|---|---|---|
| EP | 0231570 A2 | 8/1987 |
| EP | 774317 | 5/1997 |
| EP | 1 004 389 A1 | 5/2000 |
| EP | 1 036 627 A2 | 9/2000 |
| EP | 1 595 634 A1 | 11/2005 |
| GB | 1297865 A | 11/1972 |
| GB | 1397685 A | 6/1975 |
| GB | 2020591 A | 11/1979 |
| GB | 2155045 A | 9/1985 |
| JP | 05228691 A | 9/1993 |
| JP | 05237693 A | 9/1993 |
| JP | 6-023547 | 3/1994 |
| JP | 9-38772 | 2/1997 |
| JP | 2000126893 A | 5/2000 |
| JP | 2000288730 | 10/2000 |
| JP | 2000301382 A | 10/2000 |
| RU | 2 217 275 C2 | 11/2003 |

| | | |
|---|---|---|
| SU | 1780979 A1 | 12/1992 |
| SU | 1826 338 | 8/1996 |

OTHER PUBLICATIONS

Tom De Backer, European Search Report, EP 06 11 7981, Munich, Aug. 29, 2007.
Russian Office Action, 2006138266/(041676), Oct. 30, 2006.
SU 1826388 and partial translation.
Taiwan Office Action, May 2008.
Taiwan Office Action, Dec. 14, 2007.
Japanese Office Action in Japanese Application No. 2005-32411, Dec. 4, 2008.

* cited by examiner

SHORT ARC WELDING SYSTEM

The present invention relates to the art of electric arc welding and more particularly to an improved short arc welding system.

INCORPORATION BY REFERENCE

The electric arc welding field uses a variety of welding processes between the end of a consumable advancing electrode and a workpiece, which workpiece may include two or more components to be welded together. This invention relates to the short arc process wherein the advancing electrode is melted by the heat of the arc during a current pulse and then, after the molten metal forms into a ball by surface tension action, the molten metal ball is transferred to the workpiece by a short circuit action. The short circuit occurs when the advancing wire moves the ball into contact with the molten metal puddle on the workpiece, which short is sensed by a plunge in the welding voltage. Thereafter, the short circuit is broken and the short arc welding process is repeated. The invention is an improvement in short arc welding and is preferably performed by using a power source wherein the profile of the welding waveform is controlled by a waveform generator operating a pulse width modulator of a high switching speed inverter, as disclosed in several patents by assignee, such as shown in Parks U.S. Pat. No. 4,866,247; Blankenship U.S. Pat. No. 5,278,390; and, Houston U.S. Pat. No. 6,472,634. These three patents illustrating the type of high switching speed power source employed for practicing the preferred embodiment of the present invention and are incorporated herein as background technology. The waveform of the waveform generator is stored in memory as a state table, which table is selected and outputted to the waveform generator in accordance with standard technology pioneered by The Lincoln Electric Company of Cleveland, Ohio. Such selection of a table for creating the waveform profile in the waveform generator is disclosed in several prior art patents, such as the previously mentioned Blankenship U.S. Pat. No. 5,278,390. Consequently, a power source used in practicing the present invention is now commonly known and constitutes background technology used in the present invention. An aspect of the novel short arc welding system of the present invention employs a circuit to determine the total energy of the melting pulse forming the molten metal ball of the advancing electrode, such as described in Parks U.S. Pat. No. 4,866,247. The total energy of the melting pulse is sensed by a watt meter having an integrated output over the time of the melting pulse. This technology is incorporated by reference herein since it is employed in one aspect of the present invention. After a short has been created in a short arc welding system, the short is cleared by a subsequent increase in the welding current. Such procedure is well known in short arc welding systems and is described generally in Ihde U.S. Pat. No. 6,617,549 and in Parks U.S. Pat. No. 4,866,247. Consequently, the technology described in Ihde U.S. Pat. No. 6,617,549 is also incorporated herein as background technology. The preferred embodiment of the invention is a modification of a standard AC pulse welding system well known in the welding industry. A prior pending application of assignee describes standard pulse welding, both DC and AC, with an energy measurement circuit or program for a high frequency switching power source of the type used in practicing the AC short circuit preferred implementation of the present invention. Although not necessary for understanding the present invention or practicing the present invention, this prior application, which is Ser. No. 11/103,040 filed Apr. 11, 2005, is incorporated by reference herein.

The present invention relates to a short arc welding system for controlling the melting pulse of the system to maintain a desired time between the pulse and the actual short circuit. This time is controlled by a feedback loop involving a desired timing of the short circuit and the pulse, so that the size of the ball of the pulse is varied to maintain a consistent short circuit timing. This process is a substantial improvement of other short arc control arrangements, such as disclosed in Pijls U.S. Pat. No. 4,020,320 using two power sources. A first source maintains a constant size melting pulse and there is a fixed time between the short circuit and the subsequent clearing pulse. There is no feedback between the pulsed timing and a parameter of the melting pulse, as employed in the present invention. A desired time is maintained between the end of the melting pulse and the short circuit event. By fixing the desired time using a feedback loop concept, arc stability is improved. This invention is applicable to a DC process, as shown in Pijls U.S. Pat. No. 4,020,320, but is primarily advantageous when using an AC short arc welding system. Consequently, Pijls 4,020,320 is incorporated by reference herein as background technology showing a control circuit for a DC short arc system wherein two unrelated timings are maintained constant without a closed loop control of the melting pulse.

THE INVENTION

In accordance with the invention, the melting pulse of the short arc waveform is controlled interactively by a feedback loop and not by fixing constant values of the melting pulse. The time between the end of the melting pulse and the short circuit is maintained by reactively changing parameters of melting pulse in a short arc welding system. The system is preferably an AC system, but can be used in a DC system of the type generally described in Pijls U.S. Pat. No. 4,020,320. Novel manipulation of the short arc waveform is facilitated by using a single power source having the waveform controlled by a waveform generator operating the pulse width modulator of a high switching speed inverter, such as disclosed in Houston U.S. Pat. No. 6,472,634. The advance realized by implementation of the present invention is an improvement over short arc welding using two separate power sources, as shown in the prior art.

In accordance with the preferred embodiment of the present invention, the short arc welding system is an AC system wherein the melting pulse has a negative polarity. To maintain a constant molten metal bead, there is a joule threshold switch to shift the power supply to a low level positive current so the molten metal on the end of the advancing electrode forms into a ball and then short circuit against the workpiece weld puddle. This AC waveform is preferably controlled by a waveform generator controlling the profile of the individual current segments of the waveform and determining the polarity of the waveform segments. In the prior art, a joule threshold switch was used to provide a constant energy to the melting pulse. In accordance with the present invention, there is a timer to measure the time for the electrode to short after the melting pulse. A feedback loop is employed to maintain a consistent time between the melting pulse and the short circuit event. This control of time stabilizes the arc and the shorting cycle. Ideally the time between the melting pulse and the short is about 1.0 ms. Depending upon the electrode size and deposition rate, the time between the melting pulse and the short circuit event is adjusted to a fixed value in the general range of 0.5 ms to 2.0 ms. Control of the timing is primarily applicable to AC short arc welding; however, the same concept is applicable to straight DC positive polarity. In both instances, the advancing wire with molten metal formed by the melting pulse is held at a low quiescent positive current facilitating the formation of a ball preparatory to the short circuit event. In either implementation of the invention, the joules or other parameter of the melting pulse is controlled by a feedback loop conditioned to maintain a preset time to the short circuit event.

The AC implementation of the present invention is primarily useful for tubular electrodes of the flux cored type. Control of the melting cycle of a flux cored electrode based upon feedback from the short circuit time is a very precise procedure to maintain stability of the AC short circuit welding process. The invention is also especially applicable to pipe welding with a cored electrode, since the welding current for such electrode is below the threshold current for spray welding. Thus, the metal transfer to the pipe joint must involve some type of short circuit, normally a globular short circuit transfer of the type to which the present invention is directed. Improving the weld stability by using AC short arc welding still resulted in instability of the arc. This instability has been overcome by implementing the present invention. Thus, the present invention is particularly applicable to AC short arc welding of a pipe joint using a cored electrode.

In accordance with the present invention there is provided a welding system for performing a short arc welding process between an advancing wire electrode and a workpiece, where the system comprises a power source with a controller for creating a current pulse introducing energy into the electrode to melt the end of the electrode and a low current quiescent metal transfer section allowing the melted metal on the end of the electrode to be deposited into the weld puddle of the workpiece. During the low current metal transfer section, the molten metal short circuits against the molten metal puddle. A timer measures the actual time between the end of the melting pulse and the short circuit event. A device is used to set a desired time between the pulse and short circuit event and a circuit is used to create a corrective signal based upon the difference between the actual time and the desired time. This corrective signal is used to control a given parameter of the melting pulse, such as the total energy introduced into the wire during the melting pulse.

In accordance with the preferred implementation of the present invention, the short arc welding process is an AC process wherein the melting pulse is performed with a negative current and the quiescent low current metal transfer section of the waveform is at a positive polarity. The AC version of the present invention is particularly applicable for welding with a flux cored electrode in several environments, such as the root pass of a pipe welding joint.

In accordance with another aspect of the present invention, the controller of the short arc welding system includes a circuit to create a short circuit clearing pulse after the short circuit. In the preferred power source a waveform generator determines the polarity and profile of the welding waveform at any given time.

In accordance with an aspect of the invention, the welding system of the present invention is used to maintain the time between the melting pulse and the short at a fixed value, which fixed value is in the general range 0.5-2.0 ms and is preferably approximately 1.0 ms.

In accordance with another aspect of the invention the short arc system is performed DC positive with both the melting pulse and the quiescent section being positive and followed by a short circuit positive clearing pulse. This implementation of the present invention does not involve a polarity change from the waveform generator during the processing of the waveform to practice the short arc welding process.

In accordance with still a further aspect of the present invention, the short arc welding system is AC and there is a circuit to control the current pulse for causing the actual time between the melting pulse and short circuit so it is the same as the desired time. Indeed, this implementation of the invention maintains a constant time, as does the preferred embodiment of the invention.

The principal implementation of the present invention controls the energy of the melting pulse to control the time between the melting pulse and the ultimate short circuit event.

Yet another aspect of the invention is the provision of a method for controlling the melting pulse of a short arc welding process so that the process has a selected time between the melting pulse and the short circuit event. The parameter controlled by this method is preferably the total energy of the melting pulse. The invention is particularly applicable for use in the root pass of a circular open root pipe joint using a flux cored electrode.

The primary object of the present invention is the provision of a short arc welding system, which system controls the spacing of the short circuit events during the process, especially when the process is performed in the AC mode.

Yet another object of the present invention is the provision of a method for short arc welding, which method controls the melting pulse based upon the time between the melting pulse and short so this time remains fixed at a desired value.

These and other objects and advantages will become apparent from the following description taken together with the accompanying drawings.

PREFERRED EMBODIMENT OF THE INVENTION

Figure 1:
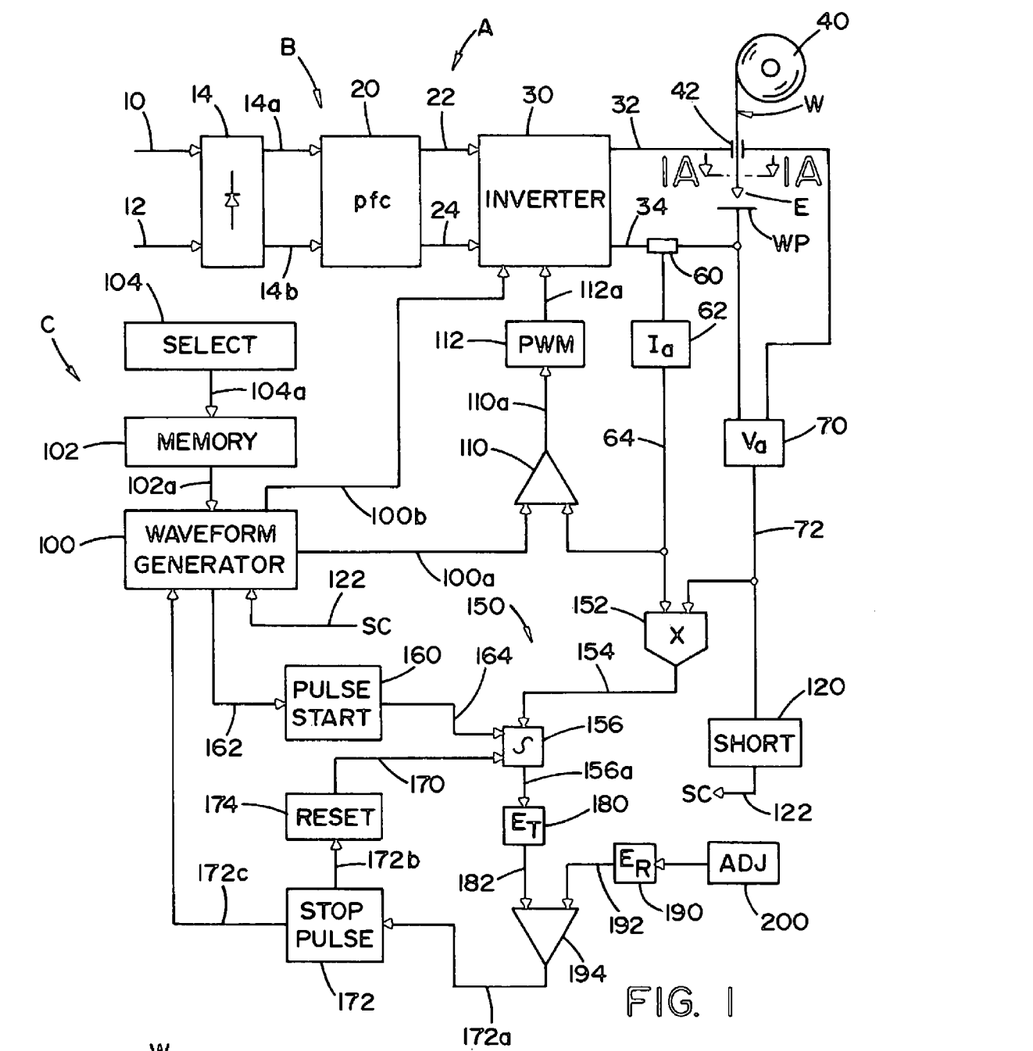
FIG. 1 is a block diagram of a short arc welding system used in the preferred embodiment of the present invention.
Figure 1A:
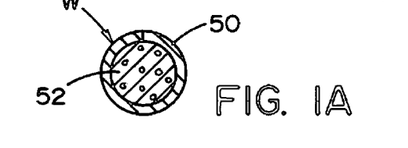
FIG. 1A is an enlarged cross-sectional view taken generally along line 1A-1A of FIG. 1.
Figure 2:
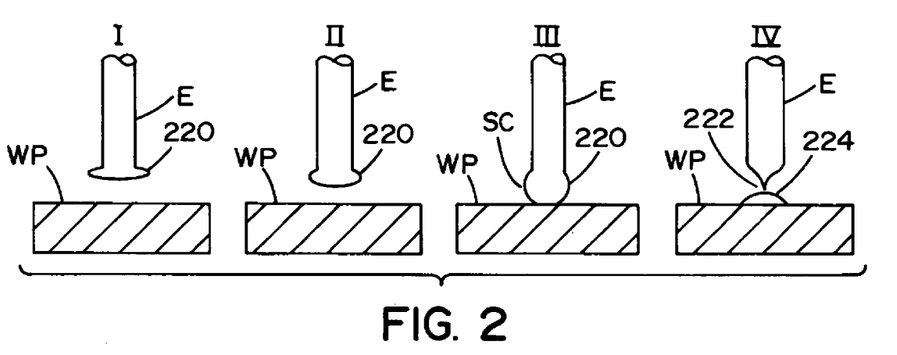
FIG. 2 is a series of side elevational views showing the stages I-IV in a short arc welding process.

In the electric arc welding industry, short arc welding is a common practice and involves the four stages I, II, III and IV as schematically disclosed in FIG. 2. The power source for performing short arc welding can be a transformer based power source; however, in accordance with the preferred embodiment of the present invention, system A, shown in FIG. 1, utilizes a high switching speed inverter based power source B having an AC supply across lines 10, 14, or a three phase supply, directed to inverter 14 creating a first DC signal across lines 14a, 14b. In accordance with standard architecture, boost or buck converter 20 is used in power source B for correcting the input power factor by creating a controlled second DC signal across output lines 22, 24. High switching speed inverter 30 converts the second DC signal across lines 22, 24 to a waveform created by a large number of current pulses across output leads 32, 34. In accordance with the preferred embodiment of the present invention, the waveform across leads 32, 34 is either DC positive or AC; therefore, inverter 30 has an output stage, not shown, that dictates the polarity of the profiled waveform across leads 32, 34. These leads are connected to electrode E and workpiece WP, respectively. In accordance with standard short arc technology, electrode E is an advancing end of wire W supplied through contact tip 42 from supply spool or drum 40. Thus, wire W is driven toward workpiece WP at a given WFS as a controlled waveform having the desired polarity is created across the gap between electrode E and workpiece WP. Wire W is preferably a flux cored wire schematically illustrated in FIG. 1A and shown to include an outer low carbon steel sheath 50 surrounding an internal flux core 52 having a fluxing agent and normally including alloying particles. Shunt 60 drives feedback current device 62 so the voltage signal on line 64 is representative of the instantaneous arc current of the welding process. In a like manner, device 70 creates a signal on output line 72 representative of the instantaneous voltage of the welding process. Controller C of inverter 30 is a digital device, such as a DSP or microprocessor, that performs functions schematically illustrated in generally analog architecture. As a central component of controller C a waveform generator 100 processes a specific waveform from a state table stored in memory unit 102 and selected according to the desired welding process by device or circuit 104. Upon selecting the desired short arc welding process a select signal 104a is directed to memory unit 102 so that the state table defining the attributes and parameters of the desired short arc welding waveform is loaded into waveform generator 100 as indicated by line 102a. Generator 100 outputs the profile of the waveform at any given time on output line 100a with the desired polarity indicated by the logic on line 100b. Illustrated power source B controlled by digital controller C is of the current control feedback type wherein the current representative voltage on line 64 is combined with the waveform profile signal on line 100a by error amplifier 110 having an output signal on line 110a to control pulse width modulator 112 in accordance with standard waveform control technology. The output signal on line 112a controls the shape of the waveform across lines 32, 34 and the polarity of the particular waveform profile being implemented is set by the logic on line 100b. In this manner, waveform generator 100 controls pulse width modulator 112 to have pulses in line 112a controlling the high frequency operation of inverter 30. This inverter switching frequency is generally greater than 18 kHz and preferably greater than about 40 kHz. As so far described, power source B with controller C operates in accordance with standard technology pioneered by The Lincoln Electric Company of Cleveland, Ohio. Controller C is digital, but illustrated in analog format. To implement a short arc welding process, it is necessary for controller C to receive feedback information regarding a short circuit condition between electrode E and workpiece WP. This feature of controller C is schematically illustrated as a short circuit detector 120 that creates a logic on line 122 to announce the existence of a short circuit event SC to waveform generator 100. Thus, the generator is informed when there is a short circuit and implements a waveform in accordance with processing a short circuit as accomplished in any short arc welding process. As so far described, controller C is standard technology, with the exception of controlling a polarity switch at the output of inverter 30 by the logic on line 100b.

To practice the invention, controller C is provided with a circuit 150 for controlling the melting pulse preparatory to the short circuit. Circuit 150 is digital, but schematically illustrated in analog architecture. The functions are implemented by the digital processor of controller C to control the energy of the melting pulse. Such energy control circuitry is described in prior copending application Ser. No. 11/103,040 filed by applicant on Apr. 11, 2005. This prior application is incorporated by reference herein not as prior art, but as related technology. As shown in the prior application, the energy of the melting pulse of a pulsed welding waveform can be controlled by circuit 150 including multiplier 152 for multiplying the instantaneous signal on lines 64, 72 to provide a signal on line 154 representing the instantaneous watts of the welding process. The wattage signal or line 154 is accumulated by a standard integrator 156 as described in Parks U.S. Pat. No. 4,866,247. Integration of the watt signal on line 154 is controlled by waveform generator 100 that creates a pulse start command shown as block 160 to correspond to the start of the melting pulse indicated by logic on line 162. The starting point is the time $t_1$ when the melting pulse is started by waveform generator 100. Output signal on line 164 starts integration of the watt signal on line 154 by integrator 156. The integration process is stopped by a logic on line 170 produced by activation of stop pulse device or circuit 172 upon receipt of logic on input line 172a. Logic on line 172a toggles device 172 to change the logic in output lines 172a and 172c. The logic on line 172c informs the waveform generator that the melting pulse is to stop to change the profile on output line 100a. At the same time, the signal on line 172b toggles reset device or circuit 174 to change the logic on line 170 to stop integration of the instantaneous watt signal. The digital number on output line 156a is loaded into digital register 180 having an output 182 representing the total energy of a given melting pulse in the short art welding process. This total energy signal is compared with a desired energy level stored in register 190 to provide a digital number or signal on line 192. Comparator 194 compares the actual energy for a given pulse represented by a number on line 182 with a desired energy level indicated by the number on line 192. The relationship between the actual energy and the desired energy controls the logic on line 172a. When the signal from line 182 equals the signal on line 192, comparator 194 changes the logic on line 172a to stop the pulse as indicated by device or circuit 172. This stops integration and stops the melting pulse being created by waveform generator 100. Circuit 150 is employed for performing the preferred embodiment of the present invention which changes the reference or desired energy for the melting pulse by changing the number on line 192 through adjustment of circuit 200. The pulse is stopped when the adjusted energy or energy threshold is reached as determined by the number signal on line 182 as compared to the signal on line 192. The preferred embodiment of the invention adjusts circuit 200 to change the reference energy for performing a novel short arc welding process by changing the melting pulse.

Figure 3:
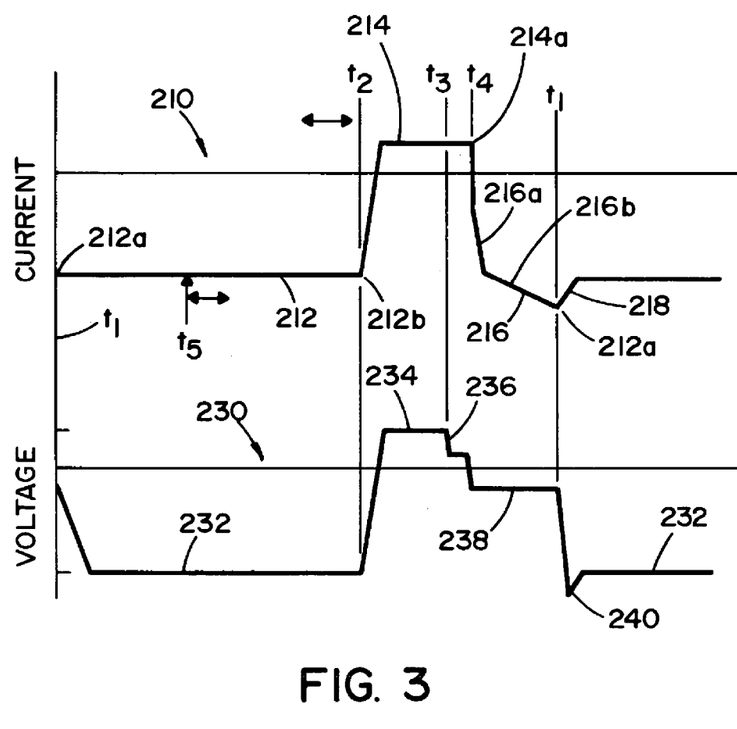
FIG. 3 is a combined current and voltage waveform graph showing the waveform implementing the preferred embodiment of the present invention as disclosed in FIG. 4 for the various stages as shown in FIG. 2.

Short arc welding system A using power source B with digital controller C is operated by adjusting circuit 200 to perform the waveform shown in FIG. 3. AC current waveform 200 has a negative melting pulse 212 represented by stage I in FIG. 2 where the melting pulse produces molten metal 220 on the end of electrode E. The level of current in pulse 212 is below current needed for spray arc so there is a transfer by a short. The time $t_1$ starts the Joule measurement as explained later. The pulse has a start position 212a at time $t_1$ and a stop position 212b at time $t_2$. Following the melting pulse, in accordance with standard practice, there is a positive low current quiescent transfer section 214, as represented by stage II of FIG. 2. In this stage, the molten metal 220 on the end of advancing electrode E is formed into a ball by surface tension action awaiting a short circuit which occurs at time $t_3$ and is shown as stage III. Consequently, the time between $t_2$ and $t_3$ is the time between the end of the melting pulse and the short circuit event, which time is indicated by the logic on line 122 as shown in FIG. 1. After stage II, a current pinch action shown as neck 222 separates the molten metal 220 from puddle 224. This electrical pinching action shown in stage IV is accelerated in accordance with standard practice by a negative short circuit pulse 216 having a first current section 216a with a steep slope and followed by a second current section 216b with a more gradual slope. Ultimately, the shorted metal separates and the SC logic on line 122 shifts to start the next current pulse at time $t_1$ indicated by a transition section 218. Waveform 210 is an AC waveform having a negative melting pulse 212, a low current quiescent section 214 and a clearance pulse 216 transitioning into the next negative pulse 212 at time $t_1$. The corresponding voltage has a waveform 230 with negative section 232, a low level positive section 234 that plunges at short 236 and is followed by a negative voltage section 238 that transitions at section 240 into the next melting pulse voltage 232. The total cycle time is from $t_1$ to the next $t_1$ and the positive transfer 214 has a time less than 20% of the total cycle time. This prevents stubbing.

The present invention involves controlling waveform 210 by waveform generator 100 of controller C so the time between the end of melting pulse 212 at $t_2$ and the time of the actual short event $t_3$ is constant based upon adjustment of circuit 200. This time delay adjustment, in the preferred embodiment, is accomplished by the circuit 250 shown in FIG. 4. In this circuit, the time between the melting pulse and at time $t_2$ and the short circuit at time $t_3$ is set to a desired level between 0.5 to 2.0 ms. Preferably, the set desired time delay is 1.0 ms, which is the level of the signal on line 254. Thus, the numerical number on line 254 is the desired time $t_2$ to $t_3$. The actual time between $t_2$ and $t_3$ is determined by timer 260 which is started at time $t_2$ and stopped at time $t_3$. The timer is reset for the next measurement by an appropriate time indicated as $t_5$ which can be adjusted to be located at various positions after $t_3$, which position is illustrated to be during the melting pulse in FIG. 3. The number on line 262 is the actual time between $t_2$ and $t_3$. This actual time is stored in register 270 which is reset at any appropriate time such as time $t_2$. Thus, the digital data on line 272 is the actual measured time between $t_2$ and $t_3$. This time is compared to the desired time on line 254. Any error amplifier can be used to digitally process the relationship of actual time to the set time. The process is schematically illustrated as a summing junction 280 and digital filter 282 having an output 284 for adjusting circuit 200. The difference between the desired time and the actual time is an error signal in line 284 which increases or decreases the desired total energy of circuit 200. The desired total energy is periodically updated at an appropriate time indicated as $t_2$ by an update circuit 290. Thus, at all times the signal in line 192 of FIG. 1 is the desired total energy for pulse 212 of the short arc process. This total energy is adjusted by any difference between time $t_2$ and time $t_3$ so the energy of pulse 212 maintains a constant or desired time delay for the upcoming short circuit. This time control stabilizes the short arc welding process of system A.

Figure 4:
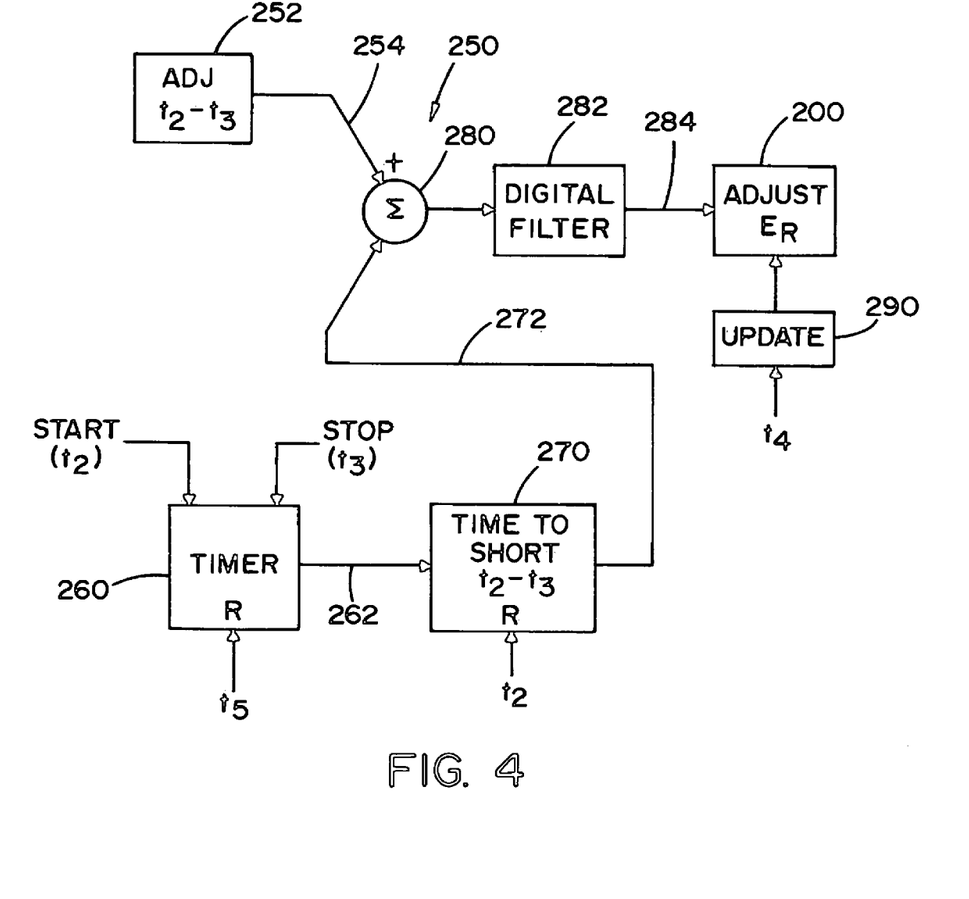
FIG. 4 is a flow chart block diagram illustrating a modification of the system in FIG. 1 to perform the preferred embodiment of the present invention.
Figure 5:
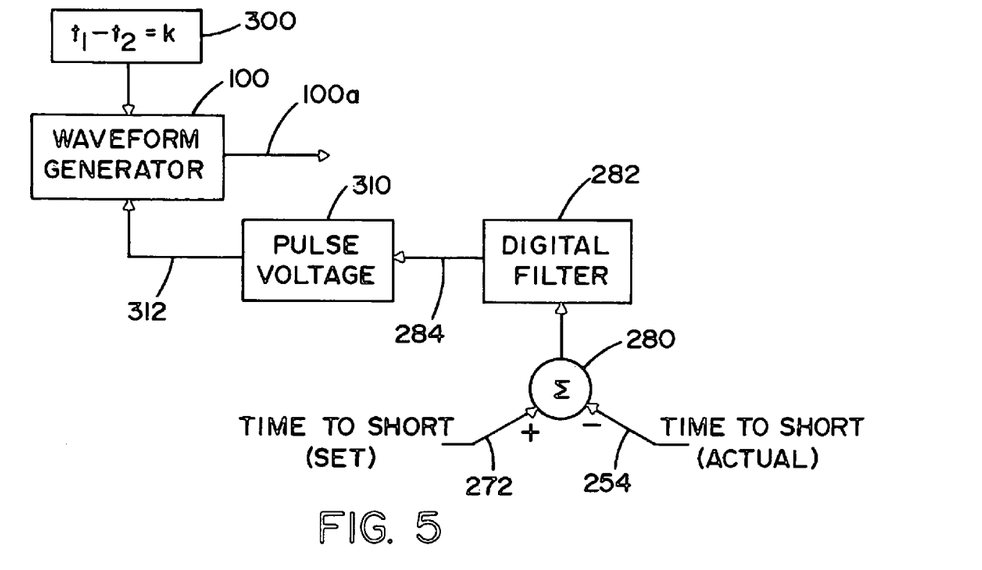
FIGS. 5 and 6 are flow chart block diagrams of a portion of the welding system shown in FIG. 1 for implementing two further embodiments of the present invention.
Figure 6:
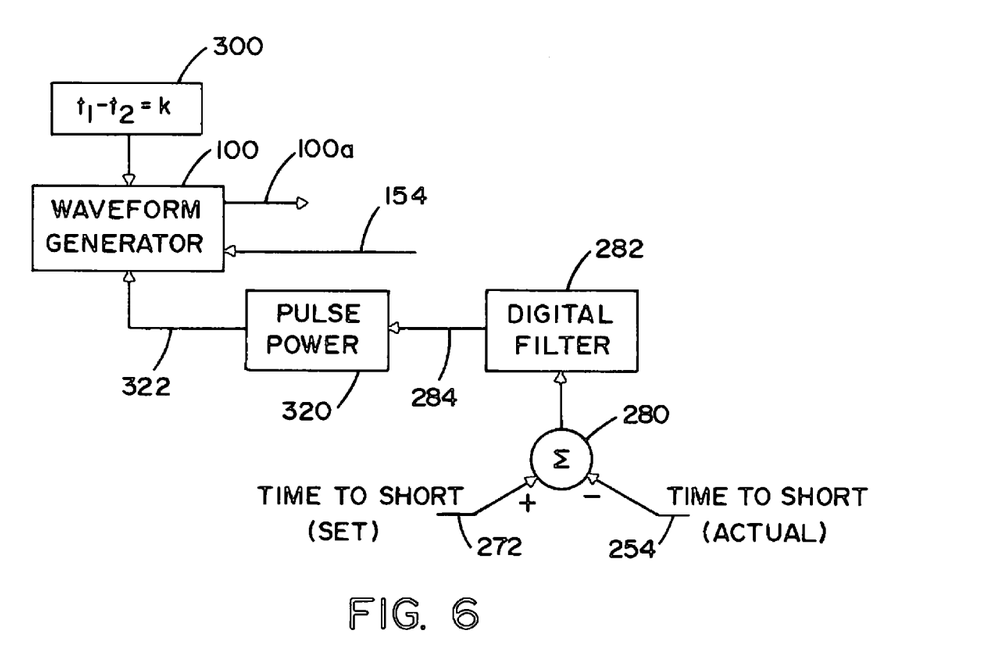

In FIG. 4, the preferred embodiment of the present invention is implemented by changing the energy threshold for the melting pulse to change the timing between the pulse and the short event. This time can also be changed by voltage or power of the melting pulse as schematically illustrated in FIGS. 5 and 6. In both of these embodiments, the time of the melting pulse $t_1$ to $t_2$ is maintained fixed as indicated by block 300. During this constant time melting pulse, the voltage or power is changed to control the time between the pulse and the short circuit event. In FIG. 5, the number on output line 284 from filter 282 controls feedback loop 310 to adjust the voltage of the melting pulse, as indicated by the numerical data on line 312. To adjust the power for controlling the delay time of the short circuit event, the number on output line 284 is used to adjust feedback loop 320, which is compared to the instantaneous power on line 154 by waveform generator 100. The change in power is a numerical value on line 322 which is compared to the digital number on line 154 for controlling the power of the melting pulse. Thus, in the first three embodiments of the present invention, the total energy of the waveform, the voltage of the waveform or the power of the waveform is adjusted to maintain a constant time between $t_2$ to $t_3$ to stabilize the arc and control the short circuit events of system A shown in FIG. 1.

Figure 7:
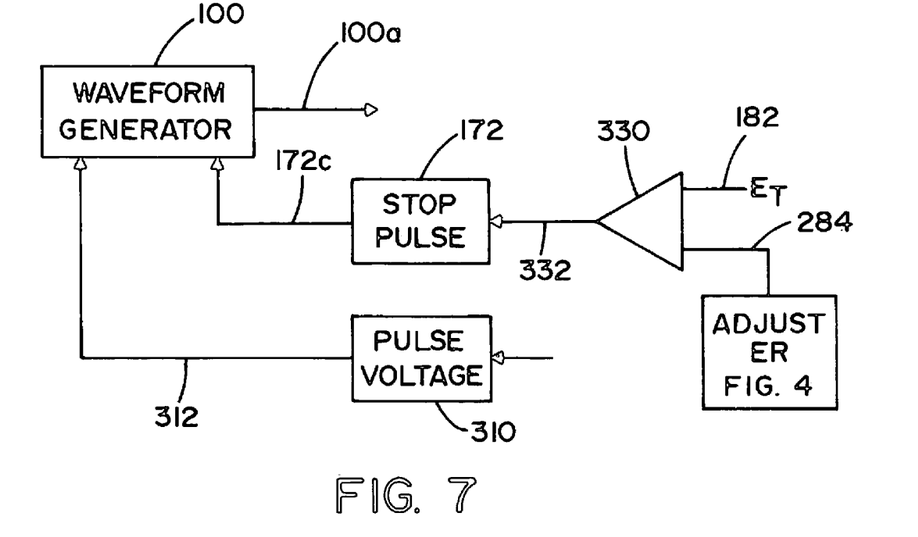
FIGS. 7 and 8 are partial flow chart block diagrams of the welding system as shown in FIG. 1 combining the preferred embodiment of the present invention shown in FIG. 4 with a combined waveform control from the embodiments of the invention shown in FIGS. 5 and 6, respectively.
Figure 8:
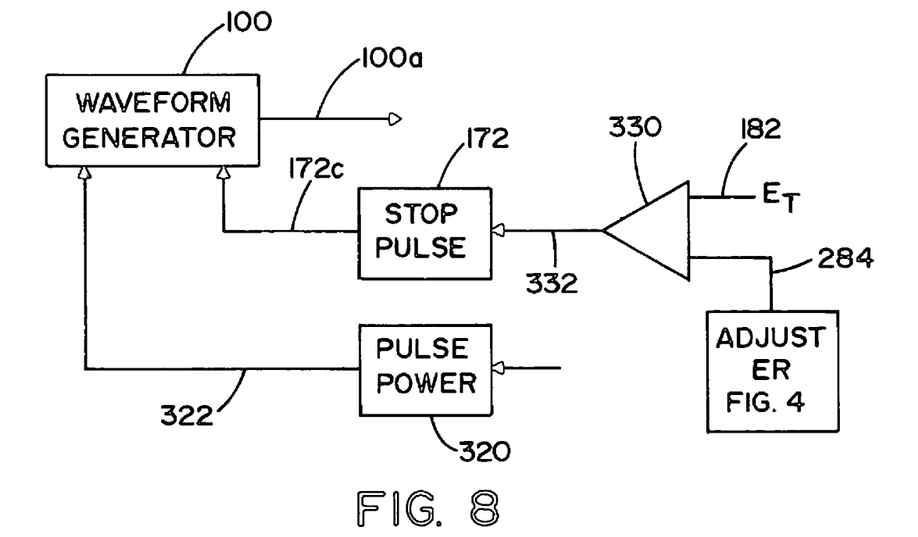

In accordance with another aspect of the invention, the energy adjustment of melting pulse 212 is combined with the two modifications of the present invention illustrated in FIGS. 5 and 6. Such combination controls are shown in FIGS. 7 and 8 wherein prior summing junction 280 and digital filter 282 are illustrated as combined in analog error amplifier 330. The component or program has output 332 with a logic for stopping the melting pulse when the threshold energy has been reached, as indicated by the logic on line 182. Thus, the total energy of the pulse is controlled together with the pulse voltage control circuit 310 in FIG. 7 and the pulse power control 320 as shown in FIG. 8. Output 312 is combined with output 172c for controlling the waveform profile in line 100a of generator 100. In a like manner, the energy level is controlled by logic on line 172c in combination with the digital information on output line 322 of power pulse control circuit 320. Other combinations of parameters can be used to control melting pulse 212 to assure an accurate control of the time between the melting pulse and the short circuit event. Such other parameters are within the skill of the art in controlling a waveform generator by closed feedback loops.

Figure 9:
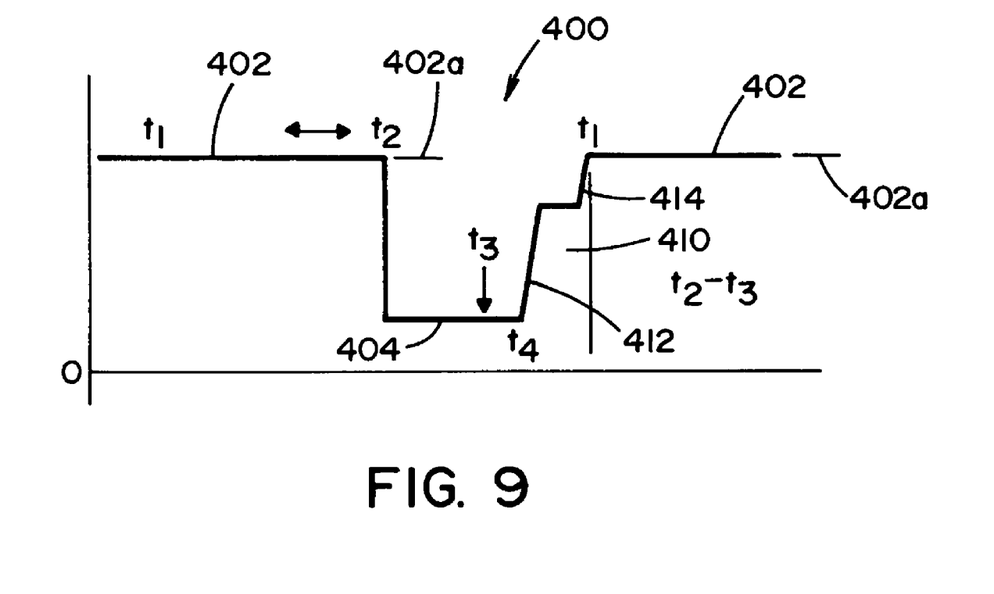
FIG. 9 is a current waveform for the DC positive implementation of the present invention; and, FIG. 10 is a schematic elevational view showing the invention used in the root pass or tacking pass of a pipe welding joint.

The invention is preferably an AC process, as shown in FIG. 4; however, DC positive waveform 400 can be used as shown in FIG. 9. Melting pulse 402 has a high positive current 402a until the pulse is terminated at time $t_2$. The current, in the DC positive mode, is limited to a level below that needed for spray arc so the metal is not detached without shorting. This concept defines the short arc welding process. Then the waveform transitions into a low level positive current section 404 awaiting the short at time $t_3$. This low level positive current is used in the preferred embodiment of the present invention and terminates at time $t_3$. Thereafter, short clearing pulse 410 is created by the waveform generator. Pulse 410 has high ramp area 412 and a stepped area 414 to bring the current back up to the high current level 402a. Various illustrated embodiments of the present invention can be used in implementing the positive current waveform 400; however, the logic on line 100b for controlling the polarity of the output waveform on lines 32, 34 is not necessary.

Figure 10:
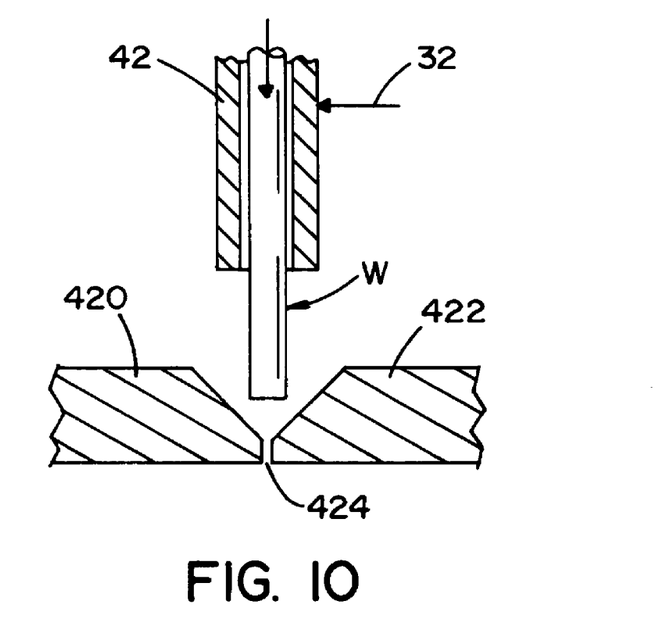

The preferred implementation of the invention is in pipe welding with a flux cored electrode as shown in FIG. 1A. Such pipe welding operation is schematically illustrated in FIG. 10 wherein pipe sections 420, 422 define an open root 424. The present invention as shown in FIG. 4 controls the waveform on wire W as it moves through contact tip 42 to open root 424 of the pipe joint. FIG. 10 shows a particular embodiment using the present invention for welding the root pass of a pipe joint to tack the pipe sections together for subsequent joining with standard welding techniques.

The present invention has been described with certain embodiments and applications. These can be combined and interchanged without departing from the scope of the invention as defined in the appended claims.

Having thus defined the invention, the following is claimed:

1. A welding system for performing a short arc welding process between an advancing wire electrode and a workpiece where said electrode has an end facing said workpiece, said system comprising:
   a power source with a controller for creating a current pulse introducing energy into said end of said electrode to melt said end and a low current quiescent metal transfer section following the end of said current pulse during which said melted electrode short circuits against said workpiece, wherein said controller includes a circuit for creating a short circuit clearing pulse after said short circuit prior to a next current pulse, said clearing pulse has a first current followed by a higher second current, the current is constant for a period of time between the first current and the second current,
   a timer for measuring an actual time between the end of said current pulse and the beginning of said short circuit;
   a device for setting a desired time from the end of said current pulse to the beginning of said short circuit;
   a circuit for creating a corrective signal based upon a difference between said actual time and said desired time; and
   a circuit responsive to said corrective signal for controlling a given parameter of said current pulse.

2. A welding system as defined in claim 1 wherein said low current of said metal transfer section has a positive polarity.

3. A welding system as defined in claim 1 wherein at least one of said first and second currents is a ramped up current.

4. A welding system as defined in claim 1 wherein said given parameter is at least one of total energy of said current pulse, an instantaneous power of said current pulse, and an instantaneous voltage of said current pulse.

5. A welding system as defined in claim 1 wherein said desired time is in the general range of 0.5-2.0 ms.

6. A welding system as defined in claim 5 wherein said desired time is about 1.0 ms.

7. A welding system as defined in claim 2 wherein said current pulse has a negative polarity.

8. A welding system as defined in claim 7 wherein said welding process has a cycle time generally equal to the time of said positive metal transfer section and said current pulse; and said metal transfer section time is less than 20% of said cycle time.

9. A welding system as defined in claim 1 wherein said current pulse has a negative polarity.

10. A welding system as defined in claim 1 wherein said circuit for controlling said given parameter of said current pulse to cause said actual time to equal said desired time.

11. A welding system as defined in claim 1 wherein said circuit for controlling said given parameter of said current pulse to provide a substantially constant time between the end of said current pulse and the beginning of said short circuit.

12. A welding system as defined in claim 1 wherein said electrode is a flux cored electrode.

13. A welding system as defined in claim 1 wherein said circuit responsive to said corrective signal for controlling energy of said current pulse to provide a constant rate of shorting.

14. A method of controlling a melting pulse of a short arc welding process where the melting pulse is followed by a low current transfer cycle, said method comprising:
   (a) measuring an actual time for a duration between the end of said melting pulse and the beginning of a short circuit during said transfer cycle;
   (b) setting a desired time for said duration;
   (c) creating a corrective signal by comparing said measured actual time and said set desired time;
   (d) adjusting a parameter of said melting pulse based upon said corrective signal; and
   (e) creating a short circuit clearing pulse after said short circuit prior to a next melting pulse, wherein said clearing pulse has a first current followed by a higher second current, the current is constant for a period of time between the first current and the second current.

15. A method as defined in claim 14 wherein said parameter is one of total energy; an instantaneous voltage, an instantaneous power, a combination of the total energy and the instantaneous voltage, and a combination of the total energy and the instantaneous power.

16. A method as defined in claim 14 wherein said current of said transfer cycle is positive.

17. A method as defined in claim 14 wherein at least one of said first and second currents is a ramped up current.

18. A method as defined in claim 14 wherein said desired time is in the range of 0.5-2.0 ms.

19. A method as defined in claim 14 wherein said desired time is about 1.0 ms.

20. A method as defined in claim 14 wherein said melting pulse has a positive polarity.

21. A method as defined in claim 14 wherein said melting pulse has a negative polarity.

22. A welding system for performing a short arc welding process by an AC waveform between an advancing wire electrode and a workpiece where said electrode has an end facing said workpiece, said system comprising:
   a power source with a controller for creating a negative current pulse introducing energy into said end of said electrode to melt said end and a low positive current quiescent metal transfer section following the end of said current pulse during which said melted electrode short circuits against said workpiece, wherein said controller includes a circuit for creating a short circuit clearing pulse after said short circuit prior to a next current pulse, said clearing pulse has a first current followed by a higher second current, the current is constant for a period of time between the first current and the second current,
   a timer for measuring an actual time between the end of said current pulse and the beginning of said short circuit;
   a device for setting a desired time from the end of said current pulse to the beginning of said short circuit;
   a circuit for creating a corrective signal based upon a difference between said actual time and said desired time; and a circuit responsive to said corrective signal for controlling total energy of said current pulse.

23. A welding system as defined in claim 22 wherein said electrode is a cored electrode.

24. A welding system as defined in claim 23 wherein said cored electrode is a flux cored electrode.

25. A welding system as defined in claim 24 wherein the time of said metal transfer section is less than 20% of the total cycle time of said waveform.

* * * * *

UNITED STATES PATENT AND TRADEMARK OFFICE
CERTIFICATE OF CORRECTION

| | | |
|---|---|---|
| PATENT NO. | : 7,842,903 B2 | |
| APPLICATION NO. | : 11/263064 | |
| DATED | : November 30, 2010 | |
| INVENTOR(S) | : Russell K. Myers | |

It is certified that error appears in the above-identified patent and that said Letters Patent is hereby corrected as shown below:

Column 12, Line 1

Dependent Claim 25 is written as "A welding system as defined in claim 24 wherein the time of said metal transfer section is less than 20% of the total cycle time of said waveform." Claim 25 is dependent on independent claim 22, not claim 24 as written in the published patent.

Claim 25 needs to be corrected to state: "A welding system as defined in claim 22 wherein the time of said metal transfer section is less than 20% of the total cycle time of said waveform."

Signed and Sealed this
Nineteenth Day of April, 2011

David J. Kappos
*Director of the United States Patent and Trademark Office*